Oct. 26, 1965 S. WAY 3,214,615
MAGNETOHYDRODYNAMIC GENERATOR APPARATUS
Filed June 15, 1962 2 Sheets-Sheet 1
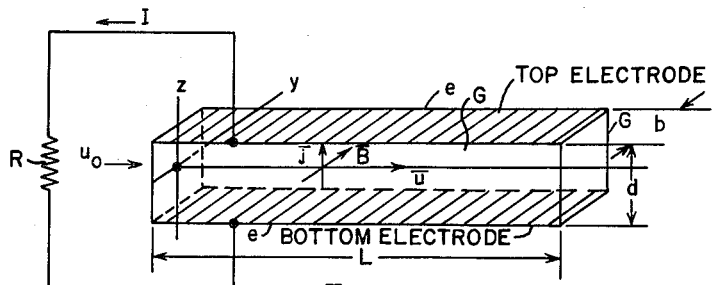
Fig. 1.
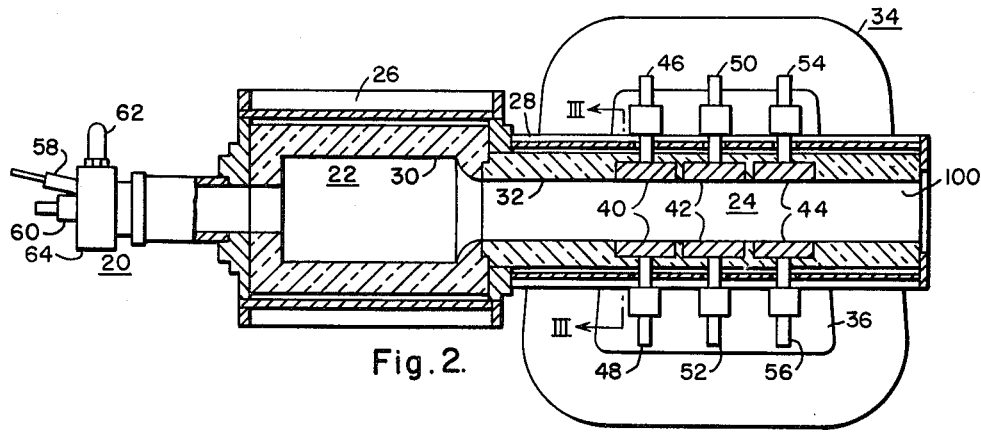
Fig. 2.
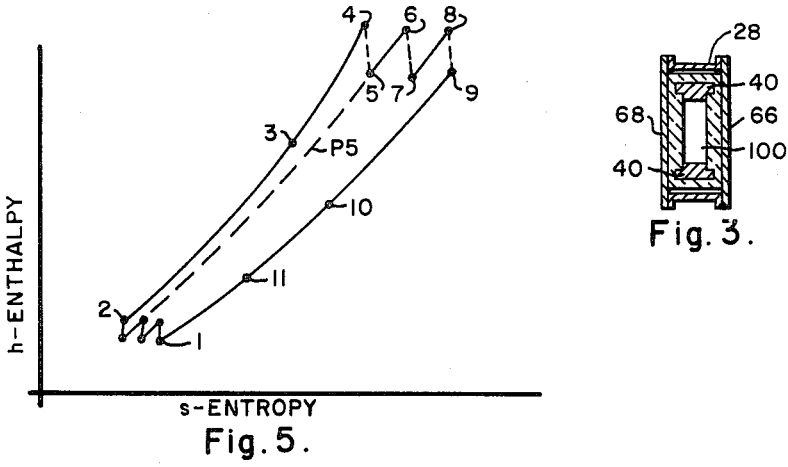
Fig. 5.
Fig. 3.

INVENTOR
Stewart Way
BY [signature]
ATTORNEY

3,214,615
MAGNETOHYDRODYNAMIC GENERATOR APPARATUS
Stewart Way, Pittsburgh, Pa., assignor to Westinghouse Electric Corporation, East Pittsburgh, Pa., a corporation of Pennsylvania
Filed June 15, 1962, Ser. No. 202,714
6 Claims. (Cl. 310—11)

The present invention relates to thermal to electrical energy converting apparatus, and more particularly to magnetohydrodynamic thermal to electrical energy converting apparatus.

The conventional method of generating large amounts of electrical power is through heat to mechanical to electrical energy conversion. The typical process involves the use of steam, which is superheated and under high pressure, to drive a prime mover, such as a steam turbine, which in turn drives the rotor of an electrical generator. In essence, the conversion process consists of the movement of metallic conductors in a magnetic field. The conductors, however, need not be metal but may be fluid conductors. This was at an early date suggested by Faraday, who experimented with mercury flowing in a glass tube between the poles of a magnet. Faraday further proposed the use of ocean tides and currents in the earth's magnetic field for power generation. Nevertheless, the use of either metallic or liquid conductors necessitates the rather roundabout method of energy conversion of thermal to mechanical to electrical energy. If one is interested in the conversion directly of thermal to electrical energy in large quantities, it is necessary to use a gas instead or metallic or liquid conductors in order to realize a large volume change.

Various magnetohydrodynamic (MHD) generators using a gas, which becomes ionized at high temperatures, have been suggested in the prior art. Karlovitz et al., in U.S. Patent No. 2,210,918, issued August 13, 1940, shows an MHD generator using an electric field axially disposed, to the flow of the gas. Because of the particular field arrangement chosen and because of the low gaseous conductivity realized, the generator did not develop appreciable power. Faraday used a cross field arrangement in his original mercury experiment, and Rudenberg used such a field arrangement in U.S. Patent No. 1,717,413, issued June 18, 1929. Rudenberg used an electric arc to heat and ionize the gas in the power generating apparatus. However, recent experiments have shown the possibility of operating through the use of a combustion gas system. To obtain a high cycle efficiency the MHD generator should be operated at temperatures above 2500° K. One of the factors contributing to the loss of efficiency of a MHD power cycle is the low ratio of generator heat drop to the total heat which must be supplied to the working fluid. Also the space requirements of the generator is directly dependent on the conductivity of the ionized working fluid. Also a higher pressure ratio, leading to higher cycle efficiency, can be used in a generator of given length where the conductivity is high. Therefore, high average temperature of the gas is desirable to maintain high conductivity, but without excessive maximum temperature.

It is, therefore, an object of the present invention to provide new and improved MHD power generating apparatus having a substantially improved cycle efficiency.

It is a further object of the present invention to provide new and improved MHD power generator apparatus having substantially improved operating cycle efficiency through the use of reheating between generator stages.

Broadly, the present invention provides heat to electrical energy converting apparatus in which: a plurality of magnetohydrodynamic generator stages are utilized to generate electrical energy by the passage of an ionized working fluid therethrough, with the working fluid being seeded with an alkali metal to cause it to more readily ionize, and with heat energy being applied to the working fluid between stages in order to maintain the working fluid in a highly conductive state.

These and other objects and improvements will become apparent when considered in view of the following specification and drawings, in which:

FIGURE 1 is a schematic diagram to aid in the explanation of the operation and theory of an MHD generator;

FIG. 2 is a schematic diagram of a possible construction of MHD generator as used in the present invention;

FIG. 3 is a section view of FIG. 2 taken at line III—III;

Figure 4:
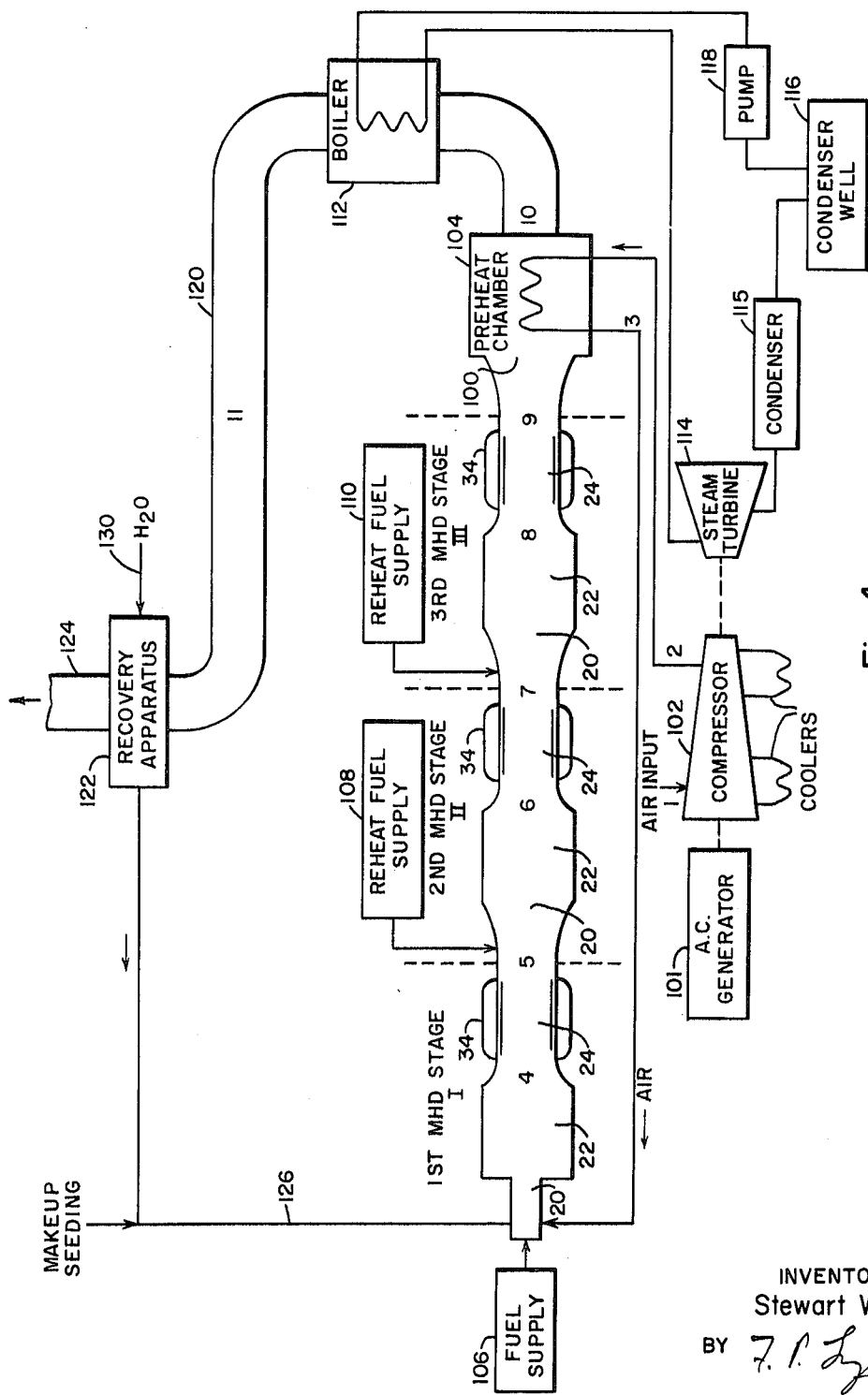
FIG. 4 is a schematic diagram of the generating system of the present invention; and, FIG. 5 is a Mollier diagram to aid in the explanation of the operating cycle of the present invention.

Reference should be made to FIG. 1 to aid in the explanation of the theory and operation of a MHD generator. Throughout the specification, the inlet state to the generator will be indicated by a subscript 0 on flow quantities, the outlet state will be indicated by the subscript 1 and the total state will be indicated by the subscrip $t$. Assume that the gas, as a working fluid, enters a duct of uniform area with a speed $u_0$ and pressure $p_0$ at temperature $T_0$. The gas is assumed to be seeded with a certain concentration of alkali metal atoms in order to enhance the conductivity of the gas. A uniform magnetic field B is provided in the $y$ direction normal to the direction of flow of the gas in the $x$ direction. Walls G spaced a distance $b$ apart are insulators, and walls $e$ spaced a distance $d$ apart are conductors which serve as electrodes, and are connected to the external load circuit including the load impedance R.

Flow velocity $u$ in conjunction with the magnetic field B gives rise to the electric field E′ relative to the moving gas, so that:

$$\vec{E'} = \vec{E} + \vec{u} \times \vec{B} \quad (1)$$

where the electric field E is due to the difference of potential between the electrodes $e$, as modified by any drop $\delta V$ at the electrode-gas interfaces. The current density $j$ may then be written as $$\vec{j} = \sigma(\vec{E} + \vec{u} \times \vec{B}) \quad (2)$$

where $\gamma$ is the conductivity of the gas. Due to the interaction of the magnetic field B and the current density $j$ a force F will be present in the gas by the relation $$\vec{F} = \vec{j} \times \vec{B} \quad (3)$$

The electric field in the $z$ direction between the faces of electrodes $e$ is:

$$E_z = -\frac{V + \delta V}{d} \quad (4)$$

where V is the voltage between the electrodes $e$. The current density is, in the Z direction, $$j_z = \sigma(u_x B_y + E_z) \quad (5)$$

The force in the $x$ direction is:

$$F_x = -j_z B_y \quad (6)$$

Since the minus sign appears, the force is in the minus $x$ or upstream direction. In the following treatment the subscripts will be dropped. Assumptions will be made as follows:

(a) State properties and flow speed are uniform over any section;
(b) The fluid is a frictionless, compressible perfect gas;
(c) Perturbation of the applied magnetic flux by the current is neglected;
(d) Leakage currents are neglected;
(e) Electric conductivity is a scalar quantity, with a value determined by the mean temperature and pressure in the generator duct;
(f) Heat losses are neglected; and
(g) The duct cross-section area is uniform.

Then writing the governing equations for the flow in the MHD duct:

Conservation of mass: $\rho u = \rho_0 u_0$ (7)

Conservation of momentum: $\frac{d}{dx}\left(\rho_0 u_0 u + \frac{p}{2}\right) = -jB$ (8)

Conservation of energy: $\rho_0 u_0 \frac{d}{dx}\left(h + \frac{u^2}{2}\right) = jE$ (9)

Gas equations: $p = \rho R_g T$; $h = \frac{\gamma}{\gamma-1} \cdot \frac{p}{\rho}$ (10)

Total temperature ratio: $\frac{T_t}{T} = 1 + \frac{\gamma-1}{2} M^2$ (11)

Mach number: $M = u\sqrt{\frac{\rho}{p\gamma}}$ (12)

Mass flow rate: $w = \rho_0 u_0 bd$ (13)

where $\rho$ is the density of the gas, $h$ is the specific enthalpy of the gas, $R_g$ is the gas constant, $\gamma$ is the ratio of specific heats of gas.

For convenience the following dimensionless parameters are introduced:

$$C_1 = C_4 + \frac{C_3}{2} + C_2(1+C_3); \quad C_2 = \frac{E}{Bu_0}; \quad C_3 = \gamma M_0^2; \quad C_4 = \frac{\gamma}{\gamma-1}$$

$$\delta = \frac{\delta V}{u_0 B d} \quad (14)$$

By combining the relationships of Equations 7, 8, 9 and 10 one finds a relation of pressure ratio and velicity ratio:

$$\frac{p}{p_0} = \frac{C_1 - C_2 C_3 \frac{u}{u_0} - \frac{C_3}{2}\left(\frac{u}{u_0}\right)^2}{C_2 + C_4 \frac{u}{u_0}} \quad (15)$$

Combining Equations 8 and 5 and with substitution for the pressure $p$ from Equation 15 gives a relationship between the velocity $u$ and the distance $x$, which is:

$$\frac{\delta B^2 x}{\rho_0 u_0} = \phi\left(\frac{u}{u_0}\right) \quad (16)$$

where $$\phi\left(\frac{u}{u_0}\right) = K_1 \ln\lambda_1 + K_2 \ln\lambda_2 + \frac{1 - \frac{p}{p_0}\lambda_1 - K_3 C_3(1-\lambda_1)}{C_3(C_2+1)} \quad (17)$$

$$\lambda_1 = \frac{C_2+1}{C_2+\frac{u}{u_0}}; \quad \lambda_2 = \frac{C_2+C_4}{C_2+C_4\frac{u}{u_0}}$$

$$K_1 = 1 - \frac{K_3 C_4}{C_2(1-C_4)}; \quad K_2 = 1 - K_1 - \frac{1}{2C_4}; \quad K_3 = \frac{2C_1 + C_2^2 C_3}{2C_2 C_3(1-C_4)}$$

In particular when $x = L$, then $\mu = \mu_1$, $p = p_1$ and $\phi = \phi_1$, so that:

$$\frac{\sigma B^2 L}{\rho_0 u_0} = \phi_1 \quad (18)$$

Selection of supersonic inlet flow to the generator is inadvisable because of high leaving losses that would result; that is, exit flow would be supersonic or choked, and because of the lower temperature and conductivity that would accompanying the high Mach number.

The parameter $C_2$ is a loading parameter which measures the ratio of voltage $V$ to open circuit voltage $V^*$. Therefore, from Equations 4 and 5, the open circuit voltage is:

$$V^* = u_0 B d (1-\delta) \quad (19)$$

While generally, the voltage $V$ is by Equation 14

$$V = u_0 B d (-C_2 - \delta) \quad (20)$$

Then the ratio of voltage to open circuit voltage is:

$$\frac{V}{V^*} = \frac{-C_2 - \delta}{1 - \delta} \quad (21)$$

For the case $\delta = 0$ the loading parameter $C_2$ is simply $V/V^*$. At short circuit conditions $C_2$ is equal to $-\delta$, if we have electrode drops, or zero if $\delta = 0$. At open circuit $C_2 = -1$.

For subsonic flow in the MHD constant area generator, the velocity increases and hence we have the ratio of $u_1/u_0$ greater than 1. A limit for $u_1/u_0$ is set by choking. Choking is most prone to occur at the short circuit condition, and can be avoided if, for $\delta = 0$, the relation:

$$\frac{u_1}{u_0} < \sqrt{\frac{2C_1}{2C_3 C_4 - C_3}} \quad (22)$$

is provided. For MHD generator design $u_1/u_0$ may be chosen and $L$ calculated from Equation 18. For analysis of a particular generator $L$ is fixed, and the ratio $u_1/u_0$ must be found which satisfies Equation 18 with the assigned values of $C_1$, $C_2$, $C_3$ and $C_4$. The temperature ratio for the generator is given by:

$$\frac{T_1}{T_0} = \frac{u_1}{u_0} \cdot \frac{p_1}{p_0} \quad (23)$$

For a given gas composition the conductivity will be a function of mean temperature $\overline{T}$ and means pressure $\overline{p}$ such that approximately:

$$\sigma = \frac{F(\overline{T})}{\sqrt{\overline{p}}} \quad (24)$$

$$\overline{T} = \frac{1}{2}(T_0 + T_1); \overline{p} = \frac{1}{2}(p_0 + p_1)$$

It should be noted that by use of Equations 15, 18, 23 and 24 the gas-dynamic solution of the generator problem may be solved. For long ducts, wherein there may be appreciable changes of pressure or temperature, the duct can be subdivided into separate segments for purposes of analysis with the above equations.

Next, considering the electrical characteristics of the MHD generator, the open circuit voltage and the operating voltage have been mentioned above. The current from the generator may be obtained by integration of $jb$ using Equation 8 for conservation of momentum which gives $$I = \frac{\sigma u_0 B L b}{\phi_1}\left[1 - \frac{u_1}{u_0} + \frac{1}{C_3}\left(1 - \frac{p_1}{p_0}\right)\right] \quad (25)$$

The power, which is the voltage $V$ times current $I$, is given by $$P = \frac{\sigma u_0^2 B^2 (Lbd)}{\phi_1}(-C_2 - \delta)\left[1 - \frac{u_1}{u_0} + \frac{1}{C_3}\left(1 - \frac{p_1}{p_0}\right)\right] \quad (26)$$

The ratio of internal to external resistance is:

$$\frac{R_i}{R} = \frac{1 - \frac{u_1}{u_0} + \frac{1}{C_3}\left(1 - \frac{p_1}{p_0}\right)}{\phi_1(-C_2 - \delta)} \quad (27)$$

At short circuit conditions the above relations apply with $\phi_1$ evaluated for $C_2 = -\delta$. In case $\delta = 0$ we have:

$$(\phi_1)_{C_2=0} = \left(1 - \frac{1}{2C_4}\right) \ln \frac{u_0}{u_1}$$
$$+ \frac{1}{C_3}\left(1 - \frac{p_1 u_0}{p_0 u_1}\right) - \frac{C_1}{2C_4 C_3}\left(1 - \frac{u_0^2}{u_1^2}\right) \quad (28)$$

The nature of the dependence of the current I on the loading parameter $C_2$ may be seen if we examine the case of $u_1/u_0$ close to unity. In this case the approximate values of current $I_a$ and power $P_a$ are:

$$I_a = \sigma u_0 B L d (1 + C_2) \quad (29)$$

$$P_a = \sigma u_0^2 B^2 (bLd)(1+C_2)(-C_2-\delta) \quad (30)$$

Thus, it can be seen that $P_a$ depends parabolically on the parameter $C_2$ or the current $I_a$.

In FIG. 2 are shown the three major components of an MHD conductor and generator assembly. The components are: the combustion chamber 20, the mixer chamber 22 and the generator chamber 24. The metal walls 26 and 28 of the mixer 22 and the generator 24 are both lined with a refractory ceramic layer 30 and 32, respectively, and are preferably water cooled on the outside. The mixer 22 serves to provide space and time for completion of combustion, and acts as a plenum chamber from which the hot gases can be discharged into the generator duct 100. The magnet 34 which may be have a horseshoe shaped core, with poles 36 on opposite sides of the generator, is disposed to provide a magnetic field normal to the flow of the gas through the generator duct 7, i.e., perpendicular to the plane of the paper in FIG. 2.

The generator 24 may have a plurality of pairs of electrodes 40, 42 and 44 disposed along the duct 100 of the generator 24. External electrical connections are provided through the bus connections 46 and 48, 50 and 52, and 54 and 56 to the internal electrode pairs 40, 42 and 44, respectively.

The combustion chamber 20 is provided with two fuel orifices 58 and 60 into which fuel such as propane, diesel fuel or potassium seeded diesel oil may be introduced into the combustion chamber. Oxygen may be introduced through the orifice 62 into the manifold 64 of the combustion chamber 20, if necessary, to aid in the combustion process. The required hot working gases for the MHD generator are provided by burning the fuel in the combustion chamber, a seeding material also being introduced to increase ionization of the gas. The electrodes 40, 42 and 44 may comprise silicon carbide, bonded graphite, tungsten, or zirconium oxide. The latter is best from the oxidation resistance standpoint. For the side wall insulators 66 and 68, shown in FIG. 3, materials such as stabilized zirconia and magnesium oxide may be used to provide electrical insulation between the electrodes.

The alkali metal used as a seeding element in the working fuel may be any suitable metal which is easily ionized such as potassium or cesium, and may be separately introduced into the working fluid as one of the orifices of the combustion chamber 20. It will be seen that the flow of ionized gas through the duct causes a voltage to be generated between the electrodes at the top and bottom of the duct.

Referring to FIG. 4, a MHD generating system is shown utilizing three MHD stages I, II, III, each being similar to the generator of FIG. 2, but of course, more stages could be incorporated into the system, if desired. The MHD stages II and III include fuel injectors and mixing and burning zones. Excess oxygen would be provided in stage I, or else additional oxygen would have to be injected for stages II and III. Thus, each of the MHD stages includes a combustion chamber, a mixing chamber and a generator chamber. The MHD stages are disposed in cascades and may have a common duct through which the working fluid may pass. The working fluid would be combustion products of oxygen and fuel, or air and fuel.

Referring to FIG. 5, a plot of the enthalpy $h$ of the gas as a function of the entropy $s$ of the gas, for the cycle of the system of FIG. 4 is shown, in which the numerals 1 through 11 in FIG. 5 correspond to the condition of the working fluid at the correspondingly numbered points of FIG. 4.

Air is introduced into the compressor 102 at point 1 at a pressure $p_0$. The air is compressed to a high pressure, which may for example be approximately six times $p_0$ at point 2, by a compression and intercooling action, which is well known in the art, in the compressor 102. The high pressure air at point 2 is then introduced into the preheat chamber or heat exchanger 104, where the air is heated along a constant pressure line $6p_0$ to a temperature indicated at point 3 on the diagram of FIG. 5. The high pressure and temperature air stream is then introduced into the combustion chamber of the first MHD stage I. Fuel is supplied into the combustion chamber from the fuel supply 106. The working gas through the heat of combustion in the combustion process is heated to a temperature of the order of 2500° K. at the point 4, which is at the exit of the mixing chamber of the first MHD stage I. The hot ionized gas then passes through the generator chamber of stage I, which causes electrical energy to be generated and be available at the electrodes of the generator chamber.

While passing through the generator chamber, the temperature and pressure of the ionized gas drops to point 5 in FIG. 5. As the gas passes from MHD stage I into the second MHD stage II, fuel is added to the combustion chamber of the stage II from the reheat fuel supply 108. The burning of the fuel from the reheat fuel supply 108 adds heat of combustion to the gas passing through the duct 100; thus keeping the ionized gas at a highly conductive state and increasing its temperature at point 6 to approximately the level of point 4 of 2500° K. The gas then passes through the mixing and generator chambers of the stage II. In passing through the generator chamber of the second stage II, the temperature and pressure of the gas drops to point 7 at the exit of the generator chamber.

On entering the third MHD stage III, fuel is again applied to the combustion chamber of the stage III from the reheat fuel supply 110. Again heat energy is added to the ionized gas passing therethrough to keep it in a highly conductive state. The gas then passing through the mixing chamber of stage III leaves this mixing chamber at the temperature of point 8, which is approximately that of points 4 and 6 of FIG. 5. Electrical energy then may be taken from the generator chamber of the stage III as the ionized gas passes therethrough. The gas in passing through the generator of stage III decreases in temperature and pressure to point 9.

The hot gas leaving the generator chamber of stage III then passes through the heat exchanger 104 to preheat the air as it passes from the compressor 102 into the first MHD stage I. As heat energy is extracted from the gas its temperature drops along the constant pressure line $p_0$, at point 10 of FIG. 5 to somewhat below the temperature at point 3. The air leaving the preheat chamber 104 passes through a boiler 112, where the heat energy contained therein is used to produce steam. The steam generated in the boiler 112 is then used to drive the steam turbine 114. The mechanical output of the steam turbine 114 is connected to the compressor 102, thus providing the mechanical energy necessary to drive the compressor 102 in order to compress the input air, and a conventional generator 101 may also be driven by the turbine 114. The steam leaving the steam turbine 114 passes through a condenser 115, where the steam is converted into water. The water is pumped from the condenser well 116 into the boiler 112 to be again converted into steam as the hot gas passes through the boiler 112.

The gas leaving the boiler passes through a pipe 120 to the recovery apparatus 122 and out the stack 124. The temperature at point 11 may be assumed to be approximately 500° K. in the present embodiment.

In order to cause the gas passing through the system to be ionized more readily, an alkali metal, such as potassium or cesium is added to the gas. In this particular example, cesium or a salt thereof is added to the gas flow at the first MHD stage I at the combustion chamber. Means for adding makeup seeding are provided by the line 126 in order to compensate for any loss of alkali particles as they pass through the system and out the stack 124. The atoms of alkali metal in the gas cause the gas to more readily ionize and to have a higher conductivity and are passed through the duct 100 with the flow of the gas. The recovery apparatus 122 is provided to recover the alkali from the gas before it passes to the stack 124.

The recovery apparatus 122 may comprise either an electrostatic precipitator or a water-spray scrubber, which are well known in the art, to cleanse alkali salts or hydroxide particles from air or smoke. In the electrostatic precipitator case, the particles containing the cesium are separated from the gas by electrostatic forces, collected in a sump, and dissolved in a water stream, with the water being supplied at the input 130, and are returned to the combustion chamber as a concentrated solution with the water being vaporized in the combustion chamber of the stage I. In the water-spray scrubber case, the cesium bearing molecules are dissolved by intimate contact with water spray drops, and the resulting solution is recycled to the combustion chamber of stage I where the water is vaporized.

The increase in the overall efficiency of the system through the use of the reheating features of the present invention may be shown from the following calculations in which particular values of temperatures are assumed. Suppose that $T1=300°$ K., $T2=1000°$ K. Also assume that $T5=T7=T9$, and that $T4=T6=T8$. Without the reheating features, cooling would take place along the pressure line $P_5$. Assuming, for approximate comparative purposes that the enthalpies are proportional to temperatures, the efficiency of the non-reheat cycle would be:

$$\eta = \frac{(T_4-T_3)-[(T_{11}-T_1)+(1-\eta_s)(T_{10}-T_{11})]}{T_4-T_3}$$

where $\eta_s$ is the efficiency of the steam cycle, which receives heat energy from points 10 to 11. If the above temperatures are used in this equation and the efficiency of the steam cycle $\eta_s$ is assumed to the 0.3, then for the no reheat case, the efficiency turns out to be $$\frac{350}{900} = 0.39$$

With one reheat stage the efficiency increases to 47.8%, with two reheats the efficiency increases to 53.6%, with three reheats the efficiency increases to 57.5%, and with four reheats the efficiency increases to 60.6%. Thus, a very efficiency heat to energy converting cycle may be obtained by using a plurality of reheat MHD stages in the generating system herein described.

Although the present invention has been described with a certain degree of particularity, it should be understood that the present disclosure has been made only by way of example and that numerous changes in the detail of construction and the combination of arrangement of parts and materials may be resorted to without departing from the scope and spirit of the present invention.

I claim as my invention:

1. A magnetohydrodynamic generating system comprising a plurality of generator stages, each of said stages including duct means for the flow of ionized gas, means for maintaining a magnetic field transverse to the direction of flow of the gas, and electrode means disposed transverse to the directions of the magnetic field and of the gas flow, means for providing a stream of ionized gas at high pressure and high temperature to flow through said duct means of said generator stages in series, and reheat supply means between successive generator stages for injecting a combustion agent into a combustion chamber of the associated generator stage so as to supply additional heat of combustion to the gas and maintain said gas in an efficient operating temperature range for the generation of electric current between said electrode means.

2. In heat to electrical energy conversion apparatus operative with a working fluid that may be ionized, the combination of: a plurality of magnetohydrodynamic energy converting stages connected in cascade with a common duct, said energy converting stages being operative to supply electrical energy in response to the flow of working fluid through the common duct; input fuel supply means connected to the first stage of said energy converting stages to supply fuel which is burned in order to add heat energy to the working fluid; and a plurality of reheat supply means respectively connected to subsequent stages of said energy converting stages for injecting fuel into a combustion chamber of the associated stage so as to add heat of combustion to the working fluid as it leaves a preceeding stage and thereby maintain said working fluid in an efficient operating temperature range for the generation of said electrical energy.

3. In heat to electrical conversion apparatus operative with a working fluid that may be ionized, the combination of: a plurality of magnetohydrodynamic energy converting stages connected in cascade with a common duct, each of said stages including a combustion chamber, a mixing chamber adjacent said combustion chamber along the common duct, a generator chamber adjacent said mixing chamber along the common duct, said energy converting stages being operative to supply electrical energy at said generator chambers in response to the flow of the ionized working fluid through the common duct; input fuel supply means connected to the first stage of said energy converting stages to supply fuel which is burned in order to add heat energy to the working fluid; seeding supply means connected to the first stage of said energy converting means to supply a seeding material to the working fluid to cause the working fluid to ionize more readily; and a plurality of reheat supply means respectively connected to subsequent stages from the first stage of said energy converting stages for injecting fuel into the associated combustion chamber so as to add heat of combustion to the working fluid as it leaves a preceding stage and thereby maintain said working fluid in an efficient operating temperature range for the generation of said electrical energy.

4. In heat to electrical energy conversion apparatus operative with a working fluid that may be ionized, the combination of: a plurality of magnetohydrodynamic energy converting stages connected in cascade with a common duct, said energy converting stages being operative to supply electrical energy in response to the flow of ionized working fluid through the common duct; compressing means to provide high pressure working fluid to the first stages of said energy converting stages; input fuel supply means connected to the first stage of said energy converting stages to supply fuel which is burned in order to add heat energy to the working fluid; seeding supply means connected to the first stage of said energy converting means to supply a seeding material to the working fluid to cause the working fluid to ionize more readily; and a plurality of reheat supply means respectively connected to subsequent stages from the first stage of said energy converting stages for injecting fuel into a combustion chamber of the associated stage so as to add heat of combustion to the working fluid as it leaves a preceding stage and thereby maintain said working fluid in an efficient operating temperature range for the generation of said electrical energy.

5. In heat to electrical energy conversion apparatus operative with a working fluid that may be ionized, the combination of: a plurality of magnetohydrodynamic energy converting stages connected in cascade with a common duct, said energy converting stages being operative to supply electrical energy in response to the flow of ionized working fluid through the common duct; compressing means to provide high pressure working fluid to the first stages of said energy converting stages; preheating means disposed along the common duct after said energy converting stages to add heat energy to the working fluid before being supplied to the first stage of said energy converting stages; input fuel supply means connected to the first stage of said energy converting stages to supply fuel which is burned in order to add heat energy to the working fluid; seeding supply means connected to the first stage of said energy converting means to supply a seeding material to the working fluid to cause the working fluid to ionize more readily; and a plurality of reheat supply means respectively connected to subsequent stages from the first stage of said energy converting stages for injecting fuel into a combustion chamber of the associated stage so as to add heat energy to the working fluid as it leaves a preceding stage and thereby maintain said working fluid in an efficient operating temperature range for the generation of said electrical energy.

6. In heat to electrical energy conversion apparatus operative with a working fluid that may be ionized, the combination of: a plurality of magnetohydrodynamic energy converting stages connected in cascade with a common duct, each of said stages including a combustion chamber, a mixing chamber adjacent said combustion chamber along the common duct, a generator chamber adjacent said mixing chamber along the common duct, said energy converting stages being operative to supply electrical energy at said generator chambers in response to the flow of the ionized working fluid through the common duct; compressing means to provide high pressure working fluid to the first stage of said energy converting stages; preheating means disposed along the common duct after said energy converting stages to add heat energy to the working fluid before being supplied to the first stage of said energy converting stages; input fuel supply means connected to the first stage of said energy converting stages to supply fuel which is burned in order to add heat energy to the working fluid; seeding supply means connected to the first stage of said energy converting means to supply an alkali metal to the working fluid to cause the working fluid to ionize more readily; and a plurality of reheat supply means respectively connected to subsequent stages from the first stage of said energy converting stages for injecting fuel into the associated combustion chamber so as to add heat of combustion to the working fluid as it leaves a preceding stage and thereby maintain said working fluid in an efficient operating temperature range for the generation of said electrical energy.

References Cited by the Examiner
UNITED STATES PATENTS 3,099,131    7/63    Rosa _____ 310—11 X

FOREIGN PATENTS 103,706    6/99    Germany.
885,774    12/61   Great Britain.

OTHER REFERENCES

Publication: Magnetohydrodynamics—Future Power Process? by Sporn and Kantrowitz, Power, November 1959. Pp. 62 to 65.

Publication: Experiment With MHD Power Generation, by Way et al., Journal of Engineering for Power, October 1961, pp. 397 to 403.

ORIS L. RADER, *Primary Examiner.*

DAVID X. SLINEY, *Examiner.*